United States Patent
Veeramani et al.

(10) Patent No.: US 11,870,826 B2
(45) Date of Patent: Jan. 9, 2024

(54) TECHNOLOGIES FOR PROVIDING HINTS USABLE TO ADJUST PROPERTIES OF DIGITAL MEDIA

(71) Applicant: Intel Corporation, Santa Clara, CA (US)

(72) Inventors: Karthik Veeramani, Hillsboro, OR (US); Ashish Singhi, Portland, OR (US); Rajneesh Chowdhury, Portland, OR (US); Brian E. Rogers, Aloha, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/707,337

(22) Filed: Mar. 29, 2022

(65) Prior Publication Data

US 2022/0294838 A1 Sep. 15, 2022

Related U.S. Application Data

(63) Continuation of application No. 15/063,082, filed on Mar. 7, 2016, now Pat. No. 11,310,298.

(51) Int. Cl.
*H04L 65/60* (2022.01)
*H04L 65/613* (2022.01)
(Continued)

(52) U.S. Cl.
CPC ............ *H04L 65/60* (2013.01); *H04L 65/613* (2022.05); *H04L 65/764* (2022.05); *H04L 67/10* (2013.01); *H04L 67/565* (2022.05)

(58) Field of Classification Search
CPC ................................ H04L 65/60; H04L 67/10
See application file for complete search history.

(56) References Cited

U.S. PATENT DOCUMENTS 7,877,776 B2   1/2011  Krikorian et al.
11,310,298 B2  4/2022  Veeramani et al.
(Continued)

OTHER PUBLICATIONS

International Searching Authority, "International Search Report," issued in connection with International Patent Application No. PCT/US2017/016197, dated May 12, 2017, 3 pages.
International Searching Authority, "Written Opinion," issued in connection with International Patent Application No. PCT/US2017/016197, dated May 12, 2017, 6 pages.
(Continued)

*Primary Examiner* — Philip C Lee
(74) *Attorney, Agent, or Firm* — Hanley, Flight & Zimmerman, LLC (57) ABSTRACT

Technologies for providing hints for adjusting digital media properties include a destination computing device wirelessly coupled to multiple source computing devices. The destination computing device is configured to receive digital media streams from each of a multiple number of source computing devices, process each of the received digital media streams, and output one or more of the processed digital media streams based on one or more output settings and/or or more digital media properties of the digital media. The destination computing device is further configured to determine one or more performance metrics based on an analysis of the output digital media streams, determine one or more hints for one or more of the digital media streams based on the analysis, and transmit each of the hints to a corresponding one of the source computing devices. Other embodiments are described and claimed herein.

20 Claims, 5 Drawing Sheets

(51) Int. Cl.
  *H04L 65/75* (2022.01)
  *H04L 67/565* (2022.01)
  *H04L 67/10* (2022.01)

(56) References Cited

U.S. PATENT DOCUMENTS

| | | |
|---|---|---|
| 2003/0074452 A1 | 4/2003 | Zheng et al. |
| 2008/0195924 A1 | 8/2008 | Kim et al. |
| 2008/0267213 A1 | 10/2008 | Deshpande |
| 2013/0159518 A1 | 6/2013 | Curcio et al. |
| 2013/0195119 A1* | 8/2013 | Huang .................. H04L 69/165 370/468 |
| 2016/0286244 A1 | 9/2016 | Chang et al. |
| 2017/0257411 A1 | 9/2017 | Veeramani et al. |

OTHER PUBLICATIONS

United States Patent and Trademark Office, "Non-Final Office Action," issued in connection with U.S. Appl. No. 15/063,082, dated Apr. 17, 2019, 11 pages.

United States Patent and Trademark Office, "Final Office Action," issued in connection with U.S. Appl. No. 15/063,082, dated Aug. 29, 2019, 16 pages.

United States Patent and Trademark Office, "Notice of Panel Decision from Pre-Appeal Brief Review," issued in connection with U.S. Appl. No. 15/063,082, dated Jan. 17, 2020, 2 pages.

United States Patent and Trademark Office, "Examiner's Answer to Appeal Brief," issued in connection with U.S. Appl. No. 15/063,082, dated May 8, 2020, 11 pages.

United States Patent and Trademark Office, "Patent Board Decision," issued in connection with U.S. Appl. No. 15/063,082, dated Dec. 2, 2021, 10 pages.

United States Patent and Trademark Office, "Notice of Allowance and Fee(s) Due," issued in connection with U.S. Appl. No. 15/063,082, dated Dec. 16, 2021, 6 pages.

* cited by examiner

TECHNOLOGIES FOR PROVIDING HINTS USABLE TO ADJUST PROPERTIES OF DIGITAL MEDIA

BACKGROUND

Traditionally, playback of digital media (e.g., movies, music, pictures, games, etc.) has been constrained to the computing device (e.g., desktop computer, smartphone, tablet, wearable, gaming system, television, etc.) on which the digital media is stored. However, with the advent of cloud computing related technologies and increased capabilities of computing devices, services such as digital media transmission services (i.e., streaming, casting, mirroring, etc.) have spurred along the generation, sharing, and consumption of digital media as consumer devices capable of interacting with such have become ubiquitous. The desire to share digital media between consumer interfacing computing devices, such as in home, office, and classroom environments, is increasing in tandem with the increased exposure of consumers to the digital media and providers of such digital media.

The introduction of stream-enabled computing devices has enabled digital media to be streamed, casted, or mirrored from one computing device (e.g., a smartphone, a laptop, etc.) to one or more other compatible computing devices (e.g., laptops, tablets, wearables, smart televisions, speakers, etc.) directly, or indirectly, such as via a compatible hub, dongle, etc., connected to the other computing device. In other words, digital media stored on one or more source computing devices can be transmitted to a single destination computing device, at which the received digital media can be composed and rendered (e.g., in a side-by-side configuration). As such, the destination computing device can be constrained by quality, responsiveness, and bandwidth concerns during reception, composition, and rendering of the digital media. However, present technologies are typically tuned to a single source computing device transmitting to a single destination computing device (i.e., a one-to-one configuration).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
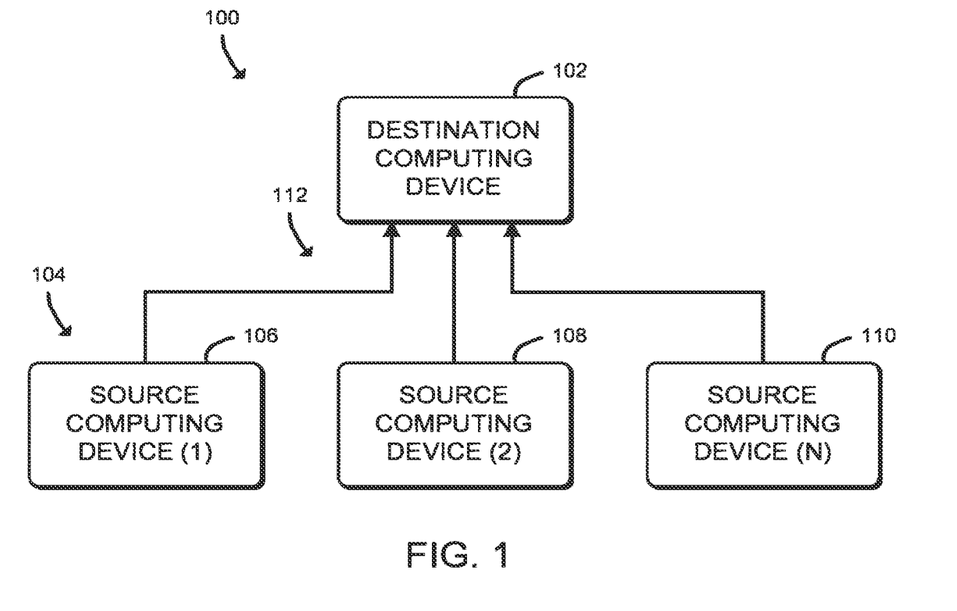
FIG. 1 is a simplified block diagram of at least one embodiment of a system for providing hints usable to adjust properties of digital media that includes a destination computing device wirelessly coupled to multiple source computing devices.

Referring now to FIG. 1, in an illustrative embodiment, a system 100 for providing hints usable to adjust one or more properties of digital media includes a destination computing device 102 communicatively coupled to multiple source computing devices 104 over wireless communication channels 112. In use, one or more of the source computing devices 104 transmits (e.g., casts, streams, mirrors, etc.) a digital media stream that may include any type of digital media (e.g., images, video, voice, audio, text, data, etc.) to the destination computing device 102. The source computing devices 104 are configured to transmit their respective digital media streams via a corresponding one of the wireless communication channels 112 previously established between the destination computing device 102 (i.e., the receiver) and the source computing devices 104 (i.e., the transmitters).

The destination computing device 102 is configured to receive each of the digital media streams from the source computing devices 104, perform any processing that might be required on the digital media streams, and output the processed digital media to an output device (e.g., a display, a speaker, etc.) of the destination computing device 102. To do so, the destination computing device 102 is configured to process (e.g., depacketize, extract payloads, parse headers, filter, reduce noise, decode, transcode, compose, render, etc.) the received digital media of the digital media streams based on one or more digital media properties. The digital media properties may include any properties related to the transmission of the digital media usable to process the digital media of the digital media stream, as well as any properties of the digital media itself, which are usable by the destination computing device 102 to process and output the digital media of the digital media stream, typically to be output in the same condition in which the digital media was captured (i.e., recorded, saved, etc.). Accordingly, the digital media properties may include encoder information (e.g., standard, version, etc.), file container/wrapper information, protocol information, etc., as well as a frame rate, an aspect ratio, a bit rate, a data rate, a sample rate, a resolution, and the like.

For example, the source computing devices 104 may indicate which encoder and container format type was used to encode and wrap the digital media, such that the destination computing device 102 can select an appropriate decoder to decode the received digital media, a type of container format to unwrap the received digital media, etc. In some embodiments, the digital media properties may be determined via one or more digital media properties received from the source computing devices 104 (e.g., during a capability exchange) and/or determined from the received digital media streams. In some embodiments, one or more of the digital media properties may be determined based on information (e.g., metadata) received within the digital media streams (e.g., in a header, a payload, a message, etc.).

As described previously, the destination computing device 102 is configured to output the processed digital media to an output device of the destination computing device 102 (e.g., output images/video to one or more displays of the destination computing device 102, output voice/audio to one or more speakers of the destination computing device 102, etc.). To do so, the destination computing device 102 is configured to output the processed digital media based on one or more output settings. The output settings may include any settings defining how the destination computing device 102 is to output the processed digital media to an output device (e.g., a display, a speaker, etc.) of the destination computing device 102, such as an audio output setting (e.g., a sample rate, an audio output volume level), a video output display layout/configuration setting, a video display setting (e.g., a resolution, a color depth, a color space, a refresh rate, an aspect ratio, etc.), and/or any other output settings.

In some embodiments, the video output display layout/configuration settings may include any information defining the display of one or more of the video outputs, such as a maximum number of video outputs to display, which digital media streams are active (i.e., presently selected for output), a location/region (i.e., relative to the bounds of the display) on which to display each of the active digital media streams, etc. Accordingly, in some embodiments, the output settings may be based on a current configuration of one or more output devices (e.g., displays, speakers, etc.) of the destination computing device 102. Additionally, in some embodiments, one or more of the output settings may be based on an instruction (i.e., input) received from a user of the destination computing device 102 (i.e., via a user-adjustable digital media output setting).

It should be appreciated that one or more of the digital media properties may be additionally and/or alternatively used by the destination computing device 102 to output the digital media. It should be further appreciated that, in some embodiments, one or more of the digital media properties may have a corresponding output setting. In such embodiments, the corresponding output setting may be used to output the processed digital media to the output device of the destination computing device 102, rather than the digital media property. In other words, the corresponding output setting may override the digital media property.

The destination computing device 102 is additionally configured to determine, measure, or otherwise collect one or more performance metrics relating to the processing and/or output of the digital media and analyze the performance metrics to determine whether to generate and transmit one or more hints to one or more source computing devices 104. The performance metrics may include any data related to the processing/outputting of the digital media at a given point in time, or over a particular period of time, which may be different than the output settings would otherwise dictate. For example, the performance metrics may include an actual output frame rate, an actual output resolution, an actual output bit rate, packet loss information, decoder queue information, an output enabled state, an average performance metric (i.e., as measured over a particular period of time), etc.

To determine whether to generate and transmit one or more hints, the destination computing device 102 is configured to compare the performance metrics (i.e., an actual performance value, measurement, level, etc.) against an expected output performance (e.g., an expected performance level), such as may be determined from one or more of the output settings (i.e., output settings presently being used to output the digital media) and/or one or more of the digital media properties. For example, a hint may be generated based on a condition being met, such as a determination that the processing and/or output of a particular digital media stream is underperforming (e.g., one or more of the performance metrics indicate a performance level less than the expected performance level). In another example, such a condition may be met when the destination computing device 102 determines that another digital media stream (i.e., from a different source computing device 104) is given priority (e.g., based on a user indicated preference or output setting). Accordingly, the output settings may include any information usable by the source computing device 104 to determine whether to adjust one or more digital media properties, such as a recommended transmission characteristic adjustment, information about other source computing devices 104, etc.

The destination computing device 102 is additionally configured to transmit the hints to one or more of the source computing devices 104 (i.e., based on which of the source computing devices 104 the hint corresponds to). Accordingly, the source computing devices 104 may modify one or more of the digital media properties in response to the hint.

The hint may include recommendation and/or provide system-level information usable by the source computing devices 104 to make an adjustment based thereupon. In other words, the source computing devices 104 are not required to make an adjustment based on the hint, but may do so according the information provided with the hint. Accordingly, the hint may be embodied as any type of data structure, such as a character, a string of characters, binary, or any other type of data type that is identifiable by the source computing devices 104 to determine the information contained therein. For example, the hint may include application programming interface (API) command(s), digital media stream output data, output performance data, digital media properties, output settings, etc. It should be appreciated that the hint may include additional information, such as a size and/or type of data structure in which the hint is contained.

Figure 2:
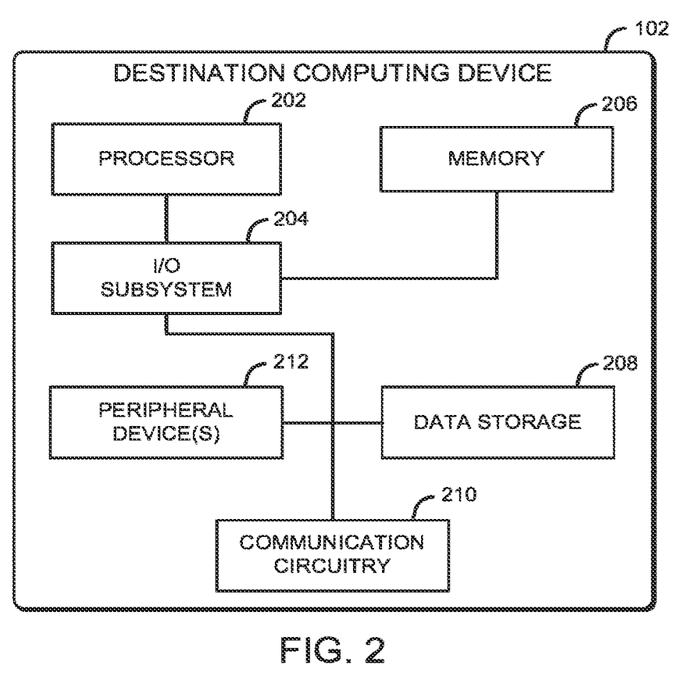
FIG. 2 is a simplified block diagram of at least one embodiment of the destination computing device of the system of FIG. 1.

The destination computing device 102 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a display, a smart television, a projector, a speaker, a connected entertainment system, a processor-based system, a multiprocessor system, and/or any other computing/communication device. As shown in FIG. 2, the illustrative destination computing device 102 includes a processor 202, an input/output (I/O) subsystem 204, a memory 206, a data storage device 208, communication circuitry 210, and one or more peripheral devices 212. Of course, in other embodiments, the destination computing device 102 may include other or additional components, such as those commonly found in a computing device. Further, in some embodiments, one or more of the illustrative components may be omitted from the destination computing device 102. Additionally, in some embodiments, one or more of the illustrative components may be incorporated in, or otherwise form a portion of, another component. For example, the memory 206, or portions thereof, may be incorporated in the processor 202, in some embodiments.

The processor 202 may be embodied as any type of processor capable of performing the functions described herein. For example, the processor 202 may be embodied as a single or multi-core processor(s), digital signal processor, microcontroller, or other processor or processing/controlling circuit. The memory 206 may be embodied as any type of volatile or non-volatile memory or data storage capable of performing the functions described herein. In operation, the memory 206 may store various data and software used during operation of the destination computing device 102, such as operating systems, applications, programs, libraries, and drivers.

The memory 206 is communicatively coupled to the processor 202 via the I/O subsystem 204, which may be embodied as circuitry and/or components to facilitate input/output operations with the processor 202, the memory 206, and other components of the destination computing device 102. For example, the I/O subsystem 204 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 204 may form a portion of a system-on-a-chip (SoC) and be incorporated, along with the processor 202, the memory 206, and/or other components of the destination computing device 102, on a single integrated circuit chip.

The data storage device 208 may be embodied as any type of device or devices configured for short-term or long-term storage of data, such as memory devices and circuits, memory cards, hard disk drives, solid-state drives, or other data storage devices, for example. It should be appreciated that the data storage device 208 and/or the memory 206 (e.g., the computer-readable storage media) may store various types of data capable of being executed by a processor (e.g., the processor 202) of the destination computing device 102, including operating systems, applications, programs, libraries, drivers, instructions, etc.

The communication circuitry 210 may be embodied as any communication circuit, device, or collection thereof, capable of enabling communications between the destination computing device 102 and the source computing devices 104 over a wireless communication channel (e.g., the wireless communication channels 112 of FIG. 1). For example, the communication circuitry 210 may include a network interface controller (NIC) and/or other devices capable of performing networking-related operations, which are not shown for clarity of the description. The communication circuitry 210 may be configured to use any one or more wireless communication technologies (e.g., Ethernet, WiFi®, Wi-Fi Direct®, Bluetooth®, Bluetooth® Low Energy (BLE), near-field communication (NFC), Worldwide Interoperability for Microwave Access (WiMAX), Digital Living Network Alliance (DLNA), Intel® Wireless Display (WiDi), etc.) and associated protocols to affect such communication. The communication circuitry 210 may be additionally configured to use any one or more wireless and/or wired communication technologies and associated protocols to effect communication with other computing devices, such as over a network, for example.

The peripheral devices 212 may include any number of input/output devices, user interface devices, and/or other peripheral devices. For example, in some embodiments, the peripheral devices 212 may include a display, a touch screen, graphics circuitry, a keyboard, a mouse, a microphone, a speaker, and/or other input/output devices, interface devices, and/or peripheral devices. The particular devices included in the peripheral devices 212 may depend on, for example, the type and/or intended use of the destination computing device 102. The peripheral devices 212 may additionally or alternatively include one or more ports, such as a USB port, for example, for connecting external peripheral devices to the destination computing device 102.

Referring again to FIG. 1, the illustrative source computing devices 104 includes a first source computing device, designated as source computing device (1) 106, a second source computing device, designated as source computing device (2) 108, and a third source computing device, designated as source computing device (N) 110 (i.e., the "Nth" source computing device of the source computing devices 104, wherein "N" is a positive integer and designates one or more additional source computing devices 104). Each of the source computing devices 104 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a smart appliance, a smart television, a connected entertainment system, an internet protocol (IP) camera, a processor-based system, a multiprocessor system, and/or any other computing/communication device.

It should be appreciated that the source computing devices 104 may include like components to those of the illustrative destination computing device 102 of FIG. 2, such as a processor, an I/O subsystem, memory, a data storage device, communication circuitry, etc. As such, further descriptions of the like components are not repeated herein with the understanding that the description of the corresponding components provided above in regard to the illustrative destination computing device 102 of FIG. 2 applies equally to the corresponding components of the source computing devices 104.

Each of the wireless communication channels 112 between the destination computing device 102 and the source computing devices 104 may be embodied as any type of wireless interconnection that may be established using any one or more wireless communication technologies and associated protocols, including Ethernet, Wi-Fi®, Wi-Fi Direct®, Bluetooth®, BLE, NFC, etc. Accordingly, the wireless communication channels 112 are usable by the destination computing device 102 and the source computing devices 104 to transmit data therebetween, as described herein.

Figure 3:
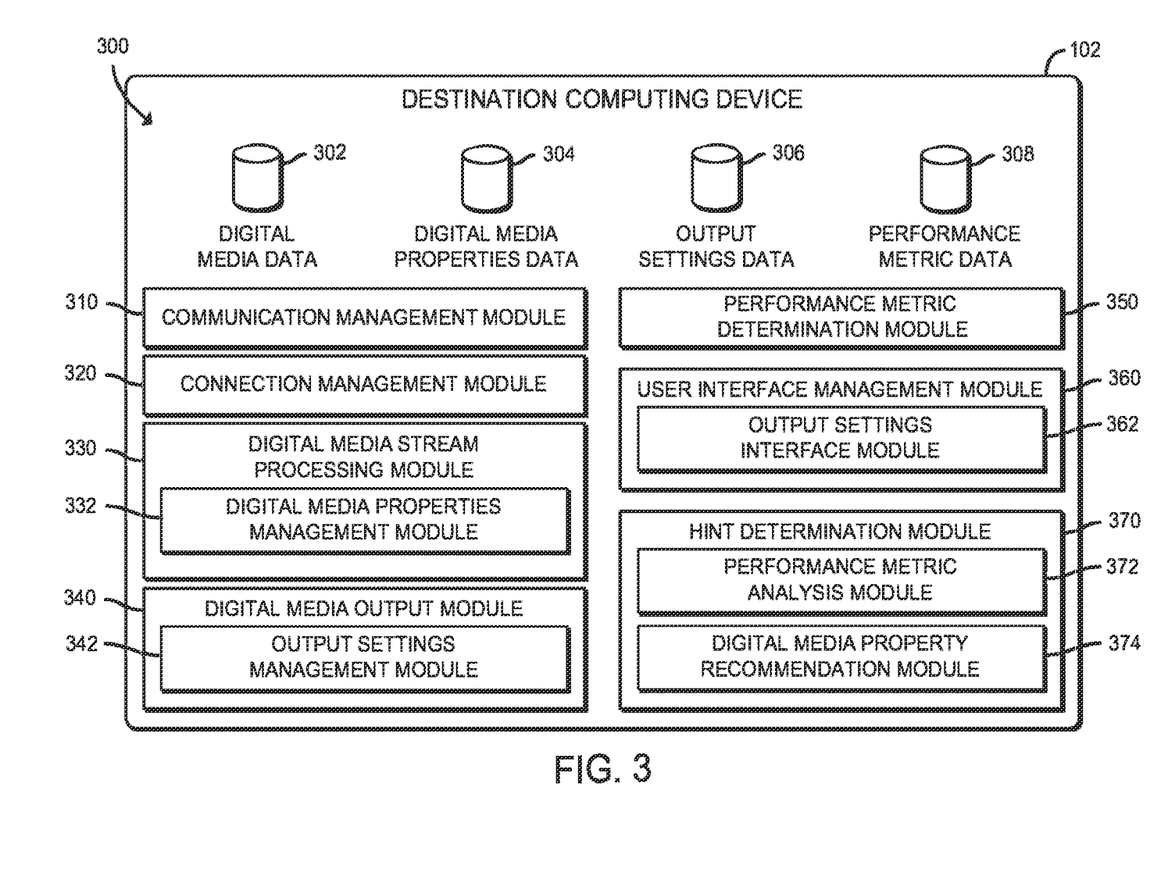
FIG. 3 is a simplified block diagram of at least one embodiment of an environment of the destination computing device of FIGS. 1 and 2.

Referring now to FIG. 3, in an illustrative embodiment, the destination computing device 102 establishes an environment 300 during operation. The illustrative environment 300 includes a communication management module 310, a connection management module 320, a digital media stream processing module 330, a digital media output module 340, a performance metric determination module 350, a user interface management module 360, and a hint determination module 370. The various modules of the environment 300 may be embodied as hardware, firmware, software, or a combination thereof. As such, in some embodiments, one or more of the modules of the environment 300 may be embodied as circuitry or collection of electrical devices (e.g., a communication management circuit 310, a connection management circuit 320, a digital media stream processing circuit 330, a digital media output circuit 340, a performance metric determination circuit 350, a user interface management circuit 360, a hint determination circuit 370, etc.).

It should be appreciated that, in such embodiments, one or more of the communication management circuit 310, the connection management circuit 320, the digital media stream processing circuit 330, the digital media output circuit 340, the performance metric determination circuit 350, the user interface management circuit 360, and the hint determination circuit 370 may form a portion of one or more of the processor 202, the I/O subsystem 204, and/or other components of the destination computing device 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 202 or other components of the destination computing device 102.

In the illustrative environment 300, the destination computing device 102 further includes digital media data 302, digital media properties data 304, output settings data 306, and performance metric data 308, each of which may be stored in the memory 206 and/or the data storage device 208 of the destination computing device 102. Further, each of the digital media data 302, the digital media properties data 304, the output settings data 306, and/or the performance metric data 308 may be accessed by the various modules and/or sub-modules of the destination computing device 102. Additionally, it should be appreciated that the data stored in, or otherwise represented by, each of the digital media data 302, the digital media properties data 304, the output settings data 306, and/or the performance metric data 308 may not be mutually exclusive relative to each other in some embodiments. For example, in some implementations, data stored in the digital media data 302 may also be stored as a portion of the properties data 304, and/or vice versa. As such, although the various data utilized by the destination computing device 102 is described herein as particular discrete data, such data may be combined, aggregated, and/or otherwise form portions of a single or multiple data sets, including duplicative copies, in other embodiments. It should be further appreciated that the destination computing device 102 may include additional and/or alternative components, sub-components, modules, sub-modules, and/or devices commonly found in a computing device, which are not illustrated in FIG. 3 for clarity of the description.

The communication management module 310, which may be embodied as hardware, firmware, software, virtualized hardware, emulated architecture, and/or a combination thereof as discussed above, is configured to facilitate inbound and outbound wireless network communications (e.g., network traffic, network packets, network flows, etc.) to and from the destination computing device 102. To do so, the communication management module 310 is configured to receive and process network packets from other computing devices (e.g., the source computing devices 104 and/or other computing device(s) communicatively coupled to the destination computing device 102). Additionally, the communication management module 310 is configured to prepare and transmit network packets to another computing device (e.g., the source computing devices 104 and/or other computing device(s) communicatively coupled to the destination computing device 102). To do so, the communication management module 310 is configured to establish communication channels with each of the communicatively coupled computing devices, such as may be established at the network layer (i.e., the IP layer). Accordingly, in some embodiments, at least a portion of the functionality of the communication management module 310 may be performed by the communication circuitry 210 of the destination computing device 102, or more specifically by a NIC of the communication circuitry 210.

The connection management module 320, which may be embodied as hardware, firmware, software, virtualized hardware, emulated architecture, and/or a combination thereof as discussed above, is configured to manage the active connections (i.e., wireless communication channels) between the destination computing device 102 and the source computing devices 104. Accordingly, during the connection process, the destination computing device 102 may collect connection information such as an IP address, a port number, access credentials, a session key, etc., as well as other identifying information of the source computing devices 104. In some embodiments, the connection information may be stored and retrieved for future use, such as upon establishing connections to those source computing devices 104 that the destination computing device 102 has been previously connected to.

Additionally, the connection management module 320 is configured to perform a capability exchange with the source computing devices 104 upon establishment of the connection. For example, the connection management module 320 may be configured to generate a message for transmission to the source computing devices 104 that indicates output capabilities of the destination computing device 102, such as supported video codecs, supported resolutions, network port numbers, etc. Accordingly, the source computing devices 104 may take appropriate action on the digital media stream prior to transmission (e.g., encode the digital media stream using an encoder compatible with the destination computing device 102).

In some embodiments, the connection management module 320 may be additionally configured to determine component capability information of the source computing devices 104 during the capability exchange. Such component capability information may include processor specifications (e.g., number of processor cores, clock speed, cache size, hyperthreading support, graphics processor specifications, etc.), memory specifications (e.g., total memory size, available memory size, etc.), power source/levels, and the like.

The digital media stream processing module 330, which may be embodied as hardware, firmware, software, virtualized hardware, emulated architecture, and/or a combination thereof as discussed above, is configured to receive and process (e.g., depacketize, extract payloads, parse headers, filter, reduce noise, decode, transcode, compose, render, etc.) the digital media streams associated with each of the source computing devices 104 presently transmitting a digital media stream to the destination computing device 102. In some embodiments, the digital media stream(s) and/or information relating thereto may be stored in the digital media data 302.

The digital media stream processing module 330 is configured to process the digital media streams based on one or more digital media properties. Accordingly, the illustrative digital media stream processing module 330 includes a digital media properties management module 332 configured to manage the digital media properties for each received digital media stream, such as may be directed by the source computing devices 104. As described previously, the digital media properties may include type of data usable to process the digital media, including encoder information (e.g., standard, version, etc.), file container/wrapper information, protocol information, a frame rate, an aspect ratio, a bit rate, a data rate, a sample rate, a resolution, etc. In some embodiments, the digital media properties may be stored in the digital media properties data 304.

The digital media output module 340, which may be embodied as hardware, firmware, software, virtualized hardware, emulated architecture, and/or a combination thereof as discussed above, is configured to output the digital media to an output device of the destination computing device 102 (e.g., output video to a display, output audio to a speaker, etc.). In some embodiments, the digital media to be output by the digital media output module 340 may be received and processed by the digital media stream processing module 330. The illustrative digital media output module 340 includes an output settings management module 342 configured to manage the output settings for each received digital media stream, such as may be directed by a user of the destination computing device 102.

As described previously, the output settings may include any data usable to output the digital media of the digital media stream, such as audio output settings (e.g., a sample rate, an audio output volume level, etc.), video output display layout/configuration settings, video display settings (e.g., resolution, color depth, color space, refresh rate, aspect ratio, etc.), etc. As also described previously, the video output display layout/configuration settings may include a maximum number of video outputs to display, which digital media streams are presently selected for output, a location/region relative to the bounds of the display on which to display each of the active digital media streams, etc. In some embodiments, the output settings may be stored in the output settings data 306.

The performance metric determination module 350 is configured to determine one or more performance metrics. As described previously, the performance metrics may include any statistical data, or metrics, that identifies an actual processing/output condition, such as an actual output frame rate, an actual output resolution, a processed bit rate, etc., any of which may be different than a corresponding digital media property or output setting. The performance metrics may additionally include information related to a present processing condition, such as packet loss information, decoder queue information, etc. As also described previously, the performance metrics may include any data related to the processing/outputting of the digital media over a particular period of time, such as an average performance metric (i.e., as measured over a particular period of time). In some embodiments, the performance metrics may be stored in the performance metric data 308.

To determine the performance metrics, the performance metric determination module 350 is configured to analyze the processing and/or output of the digital media streams received at the destination computing device 102. For example, the performance metric determination module 350 may be configured to analyze a video stream portion of the received digital media stream to determine a rate of motion in the video stream. Accordingly, based on the analysis, the performance metric determination module 350 may be further configured to assign or otherwise classify the video stream as low, medium, or high motion content. Such a classification may be usable, such as by the hint determination module 370 described below, to determine which of one or more video streams should have higher frame rates and which of one or more video streams should have lower frame rates.

The user interface management module 360, which may be embodied as hardware, firmware, software, virtualized hardware, emulated architecture, and/or a combination thereof as discussed above, is configured to manage the user interface(s) between the user of the destination computing device 102 and the destination computing device 102 itself. Accordingly, in some embodiments, the user interface management module 360 may be configured to manage one or more graphical user interface (GUI) components (i.e., output icons/visual indicators, actionable components to receive input from the user, etc.) that allow the user to view a present status, take an action based on an interaction (e.g., a finger-press, a mouse click, etc.) with one or more of the components, view and/or adjust one or more output settings. To do so, the illustrative user interface management module 360 includes an output settings interface module 362 configured to manage the digital media output setting GUIs.

The hint determination module 370, which may be embodied as hardware, firmware, software, virtualized hardware, emulated architecture, and/or a combination thereof as discussed above, is configured to determine any hints (e.g., a recommendation proposing changes to one or more of the digital media properties, information related to one or more of the other source computing devices 104, etc.) based on an analysis of one or more of the performance metrics, such as may be retrieved from the performance metric data 308 (e.g., as determined by the performance metric determination module 350), one or more of the output settings, such as may be retrieved from the digital media properties data 304 (e.g., as managed by the digital media properties management module 332), and/or one or more of the digital media properties such as may be retrieved from the output settings data 306 (e.g., as managed by the output settings management module 342), such as may be retrieved from the digital media properties data 304 (e.g., as managed by the digital media properties management module 332).

In other words, the hint determination module 370 is configured to analyze the digital media metrics determined by, measured by, or otherwise collected by the destination computing device 102, and make a determination whether to provide feedback (i.e., a hint) to one or more of the source computing devices 104. To do so, the illustrative hint determination module 370 includes a performance metric analysis module 372 and a digital media property recommendation module 374. It should be appreciated that each of the performance metric analysis module 372 and the digital media property recommendation module 374 of the hint determination module 370 may be separately embodied as hardware, firmware, software, virtualized hardware, emulated architecture, and/or a combination thereof. For example, the performance metric analysis module 372 may be embodied as a hardware component, while the digital media property recommendation module 374 is embodied as a virtualized hardware component or as some other combination of hardware, firmware, software, virtualized hardware, emulated architecture, and/or a combination thereof.

The performance metric analysis module 372 is configured to analyze the performance metrics, such as may be determined in the performance metric determination module 350, against an expected output performance. For example, the expected output performance may be determined from a comparison between one or more of the performance metrics and one or more of the output settings and/or one or more of the digital media properties. To do so, in some embodiments, the performance metric analysis module 372 may be configured to compare one or more output settings and/or one or more digital media properties to one or more of the performance metrics. The digital media property recommendation module 374 is configured to determine whether any transmission characteristic adjustment recommendations (e.g., an adjusted resolution, an adjusted frame rate, whether to transmit a video portion of the digital media stream, whether to transmit an audio portion of the digital media stream, etc.) are to be transmitted to one or more of the source computing devices 104, such as may be based on the analysis performed by the performance metric analysis module 372.

In an illustrative embodiment in which the destination computing device 102 is presently displaying multiple digital media streams in a split-screen video output display configuration, the user may be seeing smaller windows corresponding to each of the digital media streams. In other words, the video is being displayed in smaller windows, such that a smaller resolution may be more appropriate than a standard resolution. Accordingly, under such conditions, the hint determination module 370 may generate a digital media property recommendation to be transmitted to each of the source computing devices 104 for which the digital media streams corresponding thereto are being displayed in smaller windows that indicates the smaller resolution, for example.

Similarly, in another illustrative embodiment, the destination computing device 102 may be displaying only one of the received digital media streams, or none of the received digital media streams, such as when only one digital media stream is being displayed in a full-screen video output display configuration, only a single digital media stream is active in the video output display configuration, a monitor of the destination computing device 102 is turned off (i.e., no video, but audio is still being played back), the monitor is still on but the volume muted, etc. Accordingly, under such conditions, the hint determination module 370 may generate a digital media property recommendation to be transmitted to each of the source computing devices 104 for which the digital media streams are not being output that indicates transmission of the respective digital media streams may be ceased temporarily, or transmitted at a very low frame rate, for example.

In still another example, in an embodiment in which the destination computing device 102 is capable of outputting in 4K resolution, also known as ultra-high definition (UHD) resolution, and each of four source computing devices 104 is transmitting a 1080p digital media stream, the same resolution may be maintained in a split-screen video output display configuration; however, cutting down resolution may result in a loss of visual quality. Accordingly, under such conditions, the hint determination module 370 may generate a digital media property recommendation to be transmitted to each of the source computing devices 104 for which the digital media streams are being displayed that indicates to not reduce resolution, or otherwise maintain their default resolution setting.

In yet another example, in an embodiment in which the user of the destination computing device 102 has indicated a particular one of the digital media streams whose video stream is being output to a display is of particular importance (e.g., a detected event associated with a particular video stream, a larger portion of the display screen allocated to a particular video stream, etc.), the user may expect more responsiveness, better visual quality as compared to the other digital media streams, etc. Accordingly, under such conditions, the hint determination module 370 may generate a digital media property recommendation to be transmitted to one of the source computing devices 104 (e.g., indicating to increase the frame rate of the video, adjust the aspect ratio, etc.) corresponding to the digital media stream determined to be of particular importance. Additionally, the hint determination module 370 may generate a digital media property recommendation to be transmitted to the other source computing devices 104 to decrease their respective frame rates and/or bit rates, for example. In other words, the performance metric analysis module 372 may determine the responsiveness and/or quality of the other digital media streams may not be of importance to the user of the destination computing device 102.

Additionally, in some embodiments, the hint determination module 370 may be configured to transmit messages to one or more of the source computing devices 104 that include information about one or more of the other source computing devices 104. For example, in some embodiments, the hint determination module 370 may be configured to transmit a message that includes a type of digital media presently being received at the destination computing device 102 from the other source computing devices 104. As such, the other source computing devices 104 may provide a message to the destination computing device 102 asynchronously (i.e., through an out-of-band path outside of the digital media stream transmission channel). Accordingly, in such embodiments, the hint determination module 370 may interpret the message and delay providing the hint based on the message. It should be appreciated that, in some embodiments, one or more of the source computing devices 104 may not change their respective digital media properties based on the hint (e.g., the recommended transmission setting adjustment) received from the hint determination module 370.

Figure 4:
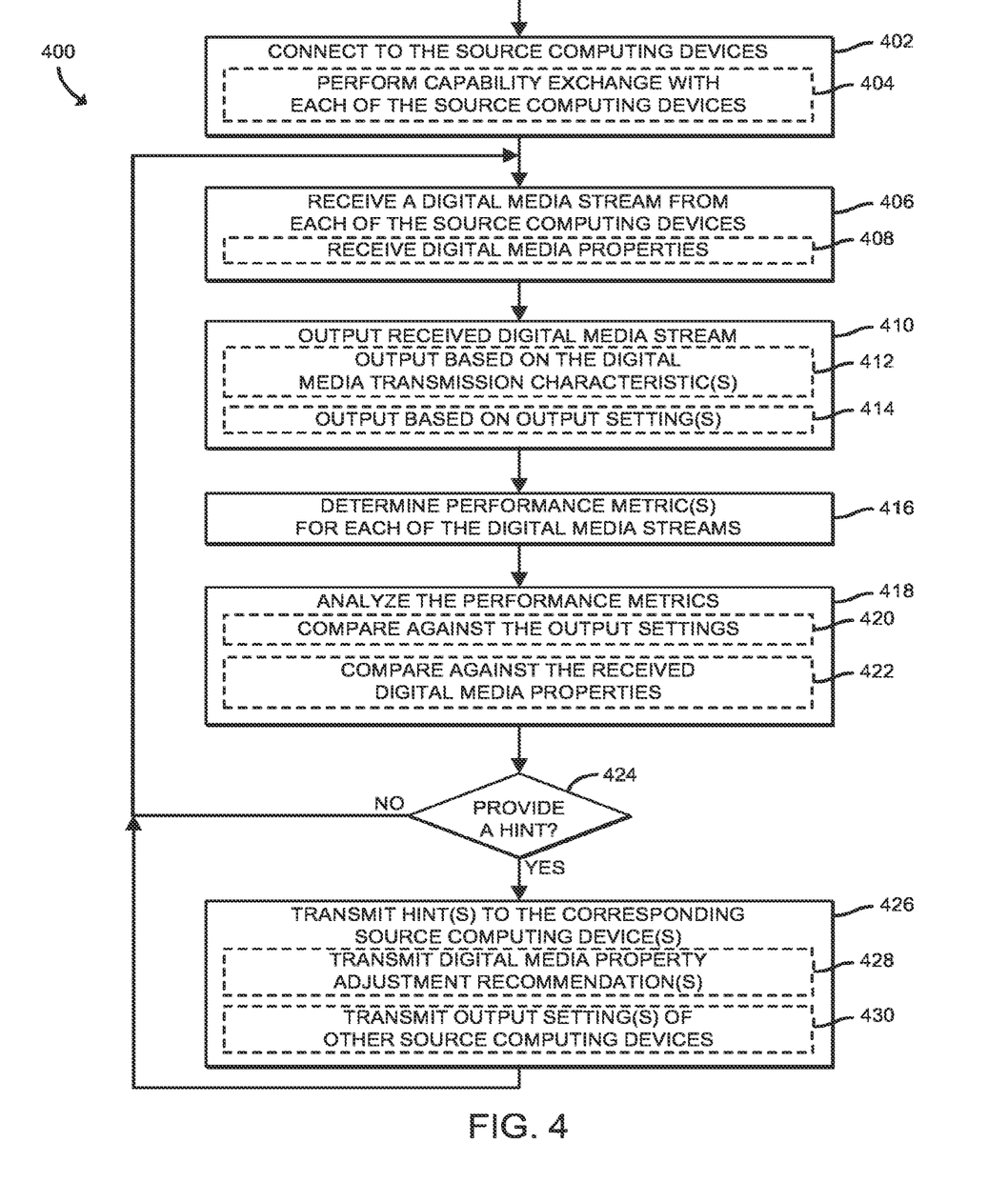
FIG. 4 is a simplified flow diagram of at least one embodiment for providing hints usable to adjust properties of digital media that may be executed by the destination computing device of FIGS. 1-3.

Referring now to FIG. 4, in use, the destination computing device 102 may execute a method 400 for providing hints usable to adjust properties of digital media. The method 400 begins in block 402, in which the destination computing device 102 connects to multiple source computing devices (e.g., the source computing devices 104). In some embodiments, in block 404, the destination computing device 102 may perform a capability exchange with each of the source computing devices 104 during the connection process. In block 406, the destination computing device 102 receives a digital media stream from each of the source computing devices 104 to which the destination computing device 102 connected to in block 402. As described previously, the digital media stream may include any type of digital media (e.g., images, video, voice, audio, text, data, etc.).

In some embodiments, in block 408, the destination computing device 102 may receive one or more digital media properties from one or more of the source computing devices 104, such as in the metadata of the digital media stream and/or via one or more parameters set by the source computing devices 104. As described previously, the digital media properties may include type of data usable to process the digital media, including encoder information (e.g., standard, version, etc.), file container/wrapper information, protocol information, a frame rate, an aspect ratio, a bit rate, a data rate, a sample rate, a resolution, etc.

In block 410, the destination computing device 102 outputs the received digital media streams. To do so, in block 412 the destination computing device 102 outputs the received digital media streams based on one or more of the digital media properties received in block 408. As described previously, the digital media properties may include any information usable by the destination computing device 102 to determine a characteristic of the streamed digital media, such as a frame rate, an aspect ratio, a bit rate, a data rate, a sample rate, and the like.

Additionally or alternative, in block 414, the destination computing device 102 outputs the received digital media streams based on one or more output settings corresponding to each of the digital media streams. The output settings may be based on a current configuration of one or more output devices (e.g., displays, speakers, etc.) of the destination computing device 102 via a user-configurable digital media output setting adjustment interface. As described previously, the output settings may include any data usable to output the digital media of the digital media stream, such as audio output settings (e.g., a sample rate, an audio output volume level, etc.), video output display layout/configuration settings, video display settings (e.g., resolution, color depth, color space, refresh rate, aspect ratio, frame rate, bit rate, data rate, etc.), etc. As also described previously, the video output display layout/configuration settings may include a maximum number of video outputs to display, which digital media streams are presently selected for output, a location/region relative to the bounds of the display on which to display each of the active digital media streams, etc.

In block 416, the destination computing device 102 determines one or more performance metrics for each of the digital media streams. As described previously, the performance metrics may include any data related to the processing/outputting of the digital media at a given point in time, or over a particular period of time, such as an actual output frame rate, an actual output resolution, an actual output bit rate, packet loss information, decoder queue information, an output enabled state, etc., as well as an average performance metric (i.e., as measured over a particular period of time).

In block 418, the destination computing device 102 analyzes the performance metrics against an expected output performance. To do so, in some embodiments, in block 420, the destination computing device 102 compares one or more of the performance metrics against one or more of the output settings. Additionally or alternatively, in some embodiments, in block 422, the destination computing device 102 compares one or more of the performance metrics against one or more of the digital media properties.

In block 424, the destination computing device 102 determines whether to provide a hint to one or more of the source computing devices 104 based on the analysis of the performance metrics performed in block 418. For example, the destination computing device 102 may determine one or more transmission setting adjustment recommendations for one or more of the digital media streams based on the analysis. If the destination computing device 102 determines not to provide a hint to one or more of the source computing devices 104, the method 400 returns to block 406, in which the destination computing device 102 receives the digital media streams from one or more of the connected source computing devices 104; otherwise, the method 400 advances to block 426. In block 426, the destination computing device 102 transmits one or more hints to a corresponding one or more source computing devices 104. For example, in block 428, the destination computing device 102 may transmit one or more digital media property adjustment recommendations. In another example, in block 430, the destination computing device 102 may transmit one or more output settings of other source computing devices 104.

Figure 5:
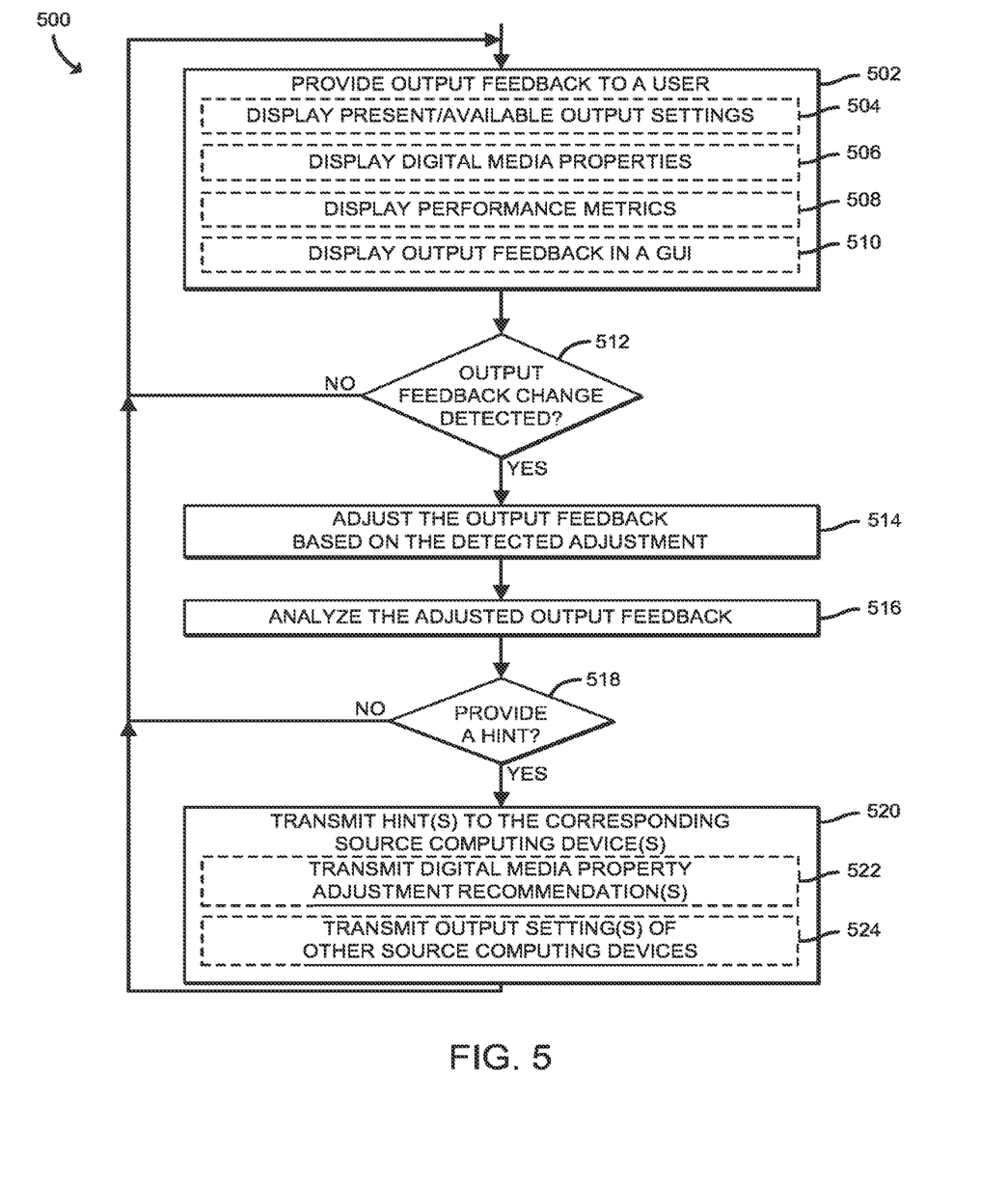
FIG. 5 is a simplified flow diagram of at least one embodiment for manually adjusting output settings that may be executed by the destination computing device of FIGS. 1-3.

Referring now to FIG. 5, in use, the destination computing device 102 may execute a method 500 for manually adjusting output settings. As described previously, the output settings may include any data usable to output the digital media of the digital media stream, such as audio output settings (e.g., a sample rate, an audio output volume level, etc.), video output display layout/configuration settings, video display settings (e.g., resolution, color depth, color space, refresh rate, aspect ratio, frame rate, bit rate, data rate, etc.), etc. As also described previously, the video output display layout/configuration settings may include a maximum number of video outputs to display, which digital media streams are presently selected for output, a location/region relative to the bounds of the display on which to display each of the active digital media streams, etc. The method 500 begins in block 502, in which the destination computing device 102 provides output feedback to a user of the destination computing device 102, such as via a display of the destination computing device 102. The output feedback indicates one or more characteristics and/or settings of one or more digital media streams being processed and output by the destination computing device 102 that have been received from multiple source computing devices 104.

For example, in block 504, the destination computing device 102 displays one or more output settings (e.g., present output settings, available output settings, etc.) to the user. In another example, in block 506, the destination computing device 102 displays one or more digital media properties (e.g., received/expected digital media properties). As described previously, the digital media properties may include type of data usable to process the digital media, including encoder information (e.g., standard, version, etc.), file container/wrapper information, protocol information, a frame rate, an aspect ratio, a bit rate, a data rate, a sample rate, a resolution, etc. In still another example, in block 508, the destination computing device 102 displays one or more performance metrics.

As described previously, the performance metrics may include any statistical data, or metrics, that identifies an actual processing/output condition, such as an actual output frame rate, an actual output resolution, a processed bit rate, etc., any of which may be different than a corresponding digital media property or output setting. The performance metrics may additionally include information related to a present processing condition, such as packet loss information, decoder queue information, etc. As also described previously, the performance metrics may include any data related to the processing/outputting of the digital media over a particular period of time, such as an average performance metric (i.e., as measured over a particular period of time). In yet another example, in block 510, the destination computing device 102 displays the output feedback via a GUI in at least a portion of the display of the destination computing device 102.

In block 512, the destination computing device 102 detects whether one or more values of the output feedback have changed. For example, an input from the user (e.g., via the output feedback GUI) may result in a change of one or more of the output settings. In another example, a change may be detected as a result of a detected processing/output change, such as a change in a digital media property or a performance metric. If the destination computing device 102 determines one or more of one or more values of the output feedback have not changed, the method 500 returns to block 502, in which the destination computing device 102 continues to provide the output feedback to the user; otherwise, the method 500 advances to block 514. In block 514, the destination computing device 102 adjusts the output feedback based on the change detected in block 512, such that the provided output feedback reflects the detected change. In block 516, the destination computing device 102 analyzes the adjusted output feedback. In block 518, the destination computing device 102 determines whether to provide a hint to one or more of the source computing devices 104.

If not, the method 500 returns to block 502, in which the destination computing device 102 provides the updated output feedback to the user; otherwise, the method 500 advances to block 520. In block 520, similar to block 426 of FIG. 4, the destination computing device 102 transmits one or more hints to a corresponding one or more source computing devices 104. For example, in block 522, the destination computing device 102 may transmit one or more digital media property adjustment recommendations to a corresponding one or more source computing devices 104. In another example, in block 524, the destination computing device 102 may transmit one or more output settings of other source computing devices 104 to a corresponding one or more source computing devices 104.

It should be appreciated that at least a portion of the methods 400 and 500 may be embodied as various instructions stored on a computer-readable media, which may be executed by the processor 202, the communication circuitry 210, and/or other components of the destination computing device 102 to cause the destination computing device 102 to perform the methods 400 and 500. The computer-readable media may be embodied as any type of media capable of being read by the destination computing device 102 including, but not limited to, the memory 206, the data storage device 208, a local memory of a NIC (not shown) of the communication circuitry 210, other memory or data storage devices of the destination computing device 102, portable media readable by a peripheral device of the destination computing device 102, and/or other media.

EXAMPLES

Illustrative examples of the technologies disclosed herein are provided below. An embodiment of the technologies may include any one or more, and any combination of, the examples described below.

Example 1 includes a destination computing device for providing hints usable to adjust properties of digital media, the destination computing device comprising a digital media stream processing module to process a plurality of digital media streams based on a plurality of digital media properties, wherein each of the digital media streams is received from one of a plurality of source computing devices wirelessly coupled to the destination computing device; a digital media output module to output one or more of the processed digital media streams to an output device of the destination computing device based on one or more output settings; a performance metric determination module to (i) analyze the processing and output of the digital media streams and (ii) determine one or more performance metrics based on the analysis; and a hint determination module to (i) analyze the one or more performance metrics, (ii) determine whether a hint is to be sent to one or more of the source computing devices based on the analysis of the one or more performance metrics, wherein the hint identifies information usable by a receiving source computing device to determine whether to change one or more of the digital media properties, (iii) generate, in response to a determination that the hint is to be sent, a message that includes the hint, and (iv) transmit the message to a corresponding one or more of the source computing devices.

Example 2 includes the subject matter of Example 1, and wherein to analyze the one or more performance metrics comprises to compare one or more of the one or more performance metrics against a corresponding one or more of the one or more output settings.

Example 3 includes the subject matter of any of Examples 1 and 2, and wherein to analyze the one or more performance metrics comprises to compare one or more of the one or more performance metrics against a corresponding one or more of the digital media properties.

Example 4 includes the subject matter of any of Examples 1-3, and wherein to determine whether the hint is to be sent to the one or more of the source computing devices comprises to determine one or more digital media transmission characteristic recommendations for one or more of the digital media streams based on the analysis of the one or more performance metrics.

Example 5 includes the subject matter of any of Examples 1-4, and wherein the one or more performance metrics identify at least one of a present processing condition or present output condition.

Example 6 includes the subject matter of any of Examples 1-5, and wherein the one or more performance metrics include at least one of an actual output frame rate, an actual output resolution, a processed bit rate, packet loss information, or decoder queue information.

Example 7 includes the subject matter of any of Examples 1-6, and wherein the digital media properties identify properties of each of the digital media streams usable to process and output each of the digital media streams.

Example 8 includes the subject matter of any of Examples 1-7, and wherein the digital media properties include at least one of a frame rate, an aspect ratio, a bit rate, a data rate, a sample rate, an encoder type, or a container format type.

Example 9 includes the subject matter of any of Examples 1-8, and wherein the one or more output settings include any data usable to output the digital media of each of the digital media streams.

Example 10 includes the subject matter of any of Examples 1-9, and wherein the one or more output settings include at least one of an audio output setting, a video output display layout/configuration setting, and a video display setting.

Example 11 includes the subject matter of any of Examples 1-10, and wherein the audio output setting includes at least one of a sample rate or an audio output volume level.

Example 12 includes the subject matter of any of Examples 1-11, and wherein the video display setting includes at least one of a resolution, a color depth, a color space, a refresh rate, an aspect ratio, a frame rate, a bit rate, or a data rate.

Example 13 includes the subject matter of any of Examples 1-12, and wherein the video output display layout/configuration settings may include a maximum number of video outputs to display, which digital media streams are presently selected for output, a location/region relative to bounds of the display on which to display each of the digital media streams.

Example 14 includes the subject matter of any of Examples 1-13, and further including a user interface management module to provide an adjustment interface of the destination computing device usable by a user of the destination computing device to make one or more user initiated adjustments to one or more of the one or more output settings presently being used to output each of the digital media streams.

Example 15 includes the subject matter of any of Examples 1-14, and wherein the adjustment interface is to provide a visual reference to at least one of the digital media properties presently being used to process each of the digital media streams, one or more of the one or more output settings presently being used to output each of the digital media streams, or one or more of the one or more performance metrics.

Example 16 includes the subject matter of any of Examples 1-15, and wherein to determine whether the hint is to be sent to the one or more source computing devices comprises to determine whether the hint is to be sent as a function of the one or more user initiated adjustments.

Example 17 includes the subject matter of any of Examples 1-16, and wherein to output one or more of the processed digital media streams to the output device of the destination computing device comprises to output each of the processed digital media streams to at least one of a display of the destination computing device or a speaker of the destination computing device.

Example 18 includes a method for providing hints usable to adjust properties of digital media, the method comprising processing, by a destination computing device, a plurality of digital media streams based on a plurality of digital media properties, wherein each of the digital media streams is received from one of a plurality of source computing devices wirelessly coupled to the destination computing device; outputting, by the destination computing device, one or more of the processed digital media streams to an output device of the destination computing device based on one or more output settings; analyzing, by the destination computing device, the processing and output of the digital media streams; determining, by the destination computing device, one or more performance metrics based on the analysis; analyzing, by the destination computing device, the one or more performance metrics determining, by the destination computing device, whether a hint is to be sent to one or more of the source computing devices based on the analysis of the one or more performance metrics, wherein the hint identifies information usable by a receiving source computing device to determine whether to change one or more of the digital media properties generating, by the destination computing device and in response to a determination that the hint is to be sent, a message that includes the hint; and transmitting, by the destination computing device, the message to a corresponding one or more of the source computing devices.

Example 19 includes the subject matter of Example 18, and wherein analyzing the one or more performance metrics comprises comparing one or more of the one or more performance metrics against a corresponding one or more of the one or more output settings.

Example 20 includes the subject matter of any of Examples 18 and 19, and wherein analyzing the one or more performance metrics comprises comparing one or more of the one or more performance metrics against a corresponding one or more of the digital media properties.

Example 21 includes the subject matter of any of Examples 18-20, and wherein determining whether the hint is to be sent to the one or more of the source computing devices comprises determining one or more digital media transmission characteristic recommendations for one or more of the digital media streams based on the analysis of the one or more performance metrics.

Example 22 includes the subject matter of any of Examples 18-21, and wherein analyzing the one or more performance metrics comprises identifying at least one of a present processing condition or present output condition based on the analysis.

Example 23 includes the subject matter of any of Examples 18-22, and wherein analyzing the one or more performance metrics comprises identifying at least one of an actual output frame rate, an actual output resolution, a processed bit rate, packet loss information, or decoder queue information.

Example 24 includes the subject matter of any of Examples 18-23, and wherein processing the plurality of digital media streams based on the digital media properties comprises processing the plurality of digital media streams based on properties of each of the digital media streams usable to process and output each of the digital media streams.

Example 25 includes the subject matter of any of Examples 18-24, and wherein processing the plurality of digital media streams based on the digital media properties comprises processing the plurality of digital media streams based on at least one of a frame rate, an aspect ratio, a bit rate, a data rate, a sample rate, an encoder type, or a container format type.

Example 26 includes the subject matter of any of Examples 18-25, and wherein outputting the processed digital media streams to the output device based on the one or more output settings comprises outputting the processed digital media streams to the output device based on any data usable to output the digital media of each of the digital media streams.

Example 27 includes the subject matter of any of Examples 18-26, and wherein outputting the processed digital media streams to the output device based on the one or more output settings comprises outputting the processed digital media streams to the output device based on at least one of an audio output setting, a video output display layout/configuration setting, or a video display setting.

Example 28 includes the subject matter of any of Examples 18-27, and wherein outputting the processed digital media streams to the output device based on the audio output setting comprises outputting the processed digital media streams to the output device based on at least one of a sample rate or an audio output volume level.

Example 29 includes the subject matter of any of Examples 18-28, and wherein outputting the processed digital media streams to the output device based on the video display setting comprises outputting the processed digital media streams to the output device based on at least one of a resolution, a color depth, a color space, a refresh rate, an aspect ratio, a frame rate, a bit rate, or a data rate.

Example 30 includes the subject matter of any of Examples 18-29, and wherein the video output display layout/configuration settings may include a maximum number of video outputs to display, which digital media streams are presently selected for output, a location/region relative to bounds of the display on which to display each of the digital media streams.

Example 31 includes the subject matter of any of Examples 18-30, and further including providing, by the destination computing device, an adjustment interface of the destination computing device usable by a user of the destination computing device to make one or more user initiated adjustments to one or more of the one or more output settings presently being used to output each of the digital media streams.

Example 32 includes the subject matter of any of Examples 18-31, and further including providing, by the destination computing device, a visual reference to at least one of the digital media properties presently being used to process each of the digital media streams, one or more of the one or more output settings presently being used to output each of the digital media streams, or one or more of the one or more performance metrics.

Example 33 includes the subject matter of any of Examples 18-32, and wherein determining whether the hint is to be sent to the one or more source computing devices comprises determining whether the hint is to be sent as a function of the one or more user initiated adjustments.

Example 34 includes the subject matter of any of Examples 18-33, and wherein outputting one or more of the processed digital media streams to the output device of the destination computing device comprises outputting each of the processed digital media streams to at least one of a display of the destination computing device or a speaker of the destination computing device.

Example 35 includes a destination computing device comprising a processor; and a memory having stored therein a plurality of instructions that when executed by the processor cause the destination computing device to perform the method of any of Examples 18-34.

Example 36 includes one or more machine readable storage media comprising a plurality of instructions stored thereon that in response to being executed result in a destination computing device performing the method of any of Examples 18-34.

Example 37 includes a destination computing device for providing hints usable to adjust properties of digital media, the destination computing device comprising means for processing a plurality of digital media streams based on a plurality of digital media properties, wherein each of the digital media streams is received from one of a plurality of source computing devices wirelessly coupled to the destination computing device; means for outputting one or more of the processed digital media streams to an output device of the destination computing device based on one or more output settings; means for analyzing the processing and output of the digital media streams; means for determining one or more performance metrics based on the analysis; means for analyzing the one or more performance metrics means for determining whether a hint is to be sent to one or more of the source computing devices based on the analysis of the one or more performance metrics, wherein the hint identifies information usable by a receiving source computing device to determine whether to change one or more of the digital media properties means for generating, in response to a determination that the hint is to be sent, a message that includes the hint; and means for transmitting the message to a corresponding one or more of the source computing devices.

Example 38 includes the subject matter of Example 37, and wherein the means for analyzing the one or more performance metrics comprises means for comparing one or more of the one or more performance metrics against one or more of the one or more output settings.

Example 39 includes the subject matter of any of Examples 37 and 38, and wherein the means for analyzing the one or more performance metrics comprises means for comparing one or more of the one or more performance metrics against one or more of the digital media properties.

Example 40 includes the subject matter of any of Examples 37-39, and wherein the means for determining whether the hint is to be sent to the one or more of the source computing devices comprises means for determining one or more digital media transmission characteristic recommendations for one or more of the digital media streams based on the analysis of the one or more performance metrics.

Example 41 includes the subject matter of any of Examples 37-40, and wherein the means for analyzing the one or more performance metrics comprises means for identifying at least one of a present processing condition or present output condition based on the analysis.

Example 42 includes the subject matter of any of Examples 37-41, and wherein the means for analyzing the one or more performance metrics comprises means for identifying at least one of an actual output frame rate, an actual output resolution, a processed bit rate, packet loss information, or decoder queue information.

Example 43 includes the subject matter of any of Examples 37-42, and wherein the means for processing the plurality of digital media streams based on the digital media properties comprises means for processing the plurality of digital media streams based on properties of each of the digital media streams usable to process and output each of the digital media streams.

Example 44 includes the subject matter of any of Examples 37-43, and wherein the means for processing the plurality of digital media streams based on the digital media properties comprises means for processing the plurality of digital media streams based on at least one of a frame rate, an aspect ratio, a bit rate, a data rate, a sample rate, an encoder type, or a container format type.

Example 45 includes the subject matter of any of Examples 37-44, and wherein the means for outputting the processed digital media streams to the output device based on the one or more output settings comprises means for outputting the processed digital media streams to the output device based on any data usable to output the digital media of each of the digital media streams.

Example 46 includes the subject matter of any of Examples 37-45, and wherein the means for outputting the processed digital media streams to the output device based on the one or more output settings comprises means for outputting the processed digital media streams to the output device based on at least one of an audio output setting, a video output display layout/configuration setting, or a video display setting.

Example 47 includes the subject matter of any of Examples 37-46, and wherein the means for outputting the processed digital media streams to the output device based on the audio output setting comprises means for outputting the processed digital media streams to the output device based on at least one of a sample rate or an audio output volume level.

Example 48 includes the subject matter of any of Examples 37-47, and wherein the means for outputting the processed digital media streams to the output device based on the video display setting comprises means for outputting the processed digital media streams to the output device based on at least one of a resolution, a color depth, a color space, a refresh rate, an aspect ratio, a frame rate, a bit rate, or a data rate.

Example 49 includes the subject matter of any of Examples 37-48, and wherein the video output display layout/configuration settings may include a maximum number of video outputs to display, which digital media streams are presently selected for output, a location/region relative to bounds of the display on which to display each of the digital media streams.

Example 50 includes the subject matter of any of Examples 37-49, and further including means for providing an adjustment interface of the destination computing device usable by a user of the destination computing device to make one or more user initiated adjustments to one or more of the one or more output settings presently being used to output each of the digital media streams.

Example 51 includes the subject matter of any of Examples 37-50, and further including means for providing a visual reference to at least one of the digital media properties presently being used to process each of the digital media streams, one or more of the one or more output settings presently being used to output each of the digital media streams, or one or more of the one or more performance metrics.

Example 52 includes the subject matter of any of Examples 37-51, and wherein the means for determining whether the hint is to be sent to the one or more source computing devices comprises means for determining whether the hint is to be sent as a function of the one or more user initiated adjustments.

Example 53 includes the subject matter of any of Examples 37-52, and wherein the means for outputting one or more of the processed digital media streams to the output device of the destination computing device comprises means for outputting each of the processed digital media streams to at least one of a display of the destination computing device or a speaker of the destination computing device.

The invention claimed is:

1. An apparatus comprising:
at least one memory;
machine readable instructions; and
processor circuitry to execute the machine readable instructions to:
mirror screens of a first source computing device and a second source computing device on an output device of the apparatus;
determine a first performance metric of the apparatus based on a first output of a first digital media stream from the first source computing device and a second performance metric of the apparatus based on a second output of a second digital media stream from the second source computing device, the first and second performance metrics to indicate performance levels of the apparatus, the first digital media stream from the first source computing device via a wireless connection;
generate a first recommendation usable by the first source computing device, the first recommendation to cause a first adjustment of at least a first property of the first digital media stream; and
transmit the first recommendation to the first source computing device and a second recommendation to the second source computing device, the second recommendation to cause a second adjustment of at least a second property of the second digital media stream, the second recommendation different from the first recommendation.

2. The apparatus of claim 1, wherein the processor circuitry is to:
determine a performance threshold corresponding to the first digital media stream based on at least one of an expected performance level of the apparatus, the at least the first property of the first digital media stream, or an output setting of the apparatus; and
compare the first performance metric against the performance threshold, wherein the processor circuitry is to generate the first recommendation in response to the first performance metric not satisfying the performance threshold.

3. The apparatus of claim 1, wherein the processor circuitry is to:
cause the first digital media stream to display in a first window and the second digital media stream to display in a second window, wherein the first and second windows are to be presented on the output device integrated into the apparatus;
detect an input to the apparatus, the input to indicate a prioritization of the first digital media stream over the second digital media stream;
in response to detecting the input:
cause a size of the first window to increase and a size of the second window to decrease;
cause the first source computing device to increase the at least the first property of the first digital media stream based on the first recommendation; and
cause the second source computing device to decrease the at least the second property of the second digital media stream based on the second recommendation.

4. The apparatus of claim 3, wherein the at least the first and second properties include at least one of encoder information, file wrapper information, protocol information, a frame rate, an aspect ratio, a bit rate, a data rate, a sample rate, or a resolution.

5. The apparatus of claim 1, wherein the first recommendation is a first hint included in a data structure identifiable by the first source computing device, the first hint including at least one of a size or a type corresponding to the data structure.

6. The apparatus of claim 1, wherein the performance levels include values corresponding to the first and second outputs of the first and second digital media streams via the output device.

7. The apparatus of claim 1, wherein the performance levels include values corresponding to a performance of the processor circuitry during the first and second outputs of the first and second digital media streams.

8. A method comprising:
    causing presenting of a first digital media stream and presenting of a second digital media stream on a display screen of a first device, the first digital media stream obtained from a second device, the second digital media stream obtained from a third device;
    computing a first performance metric of the first device based on the presenting of the first digital media stream from the second device and a second performance metric of the first device based on the presenting of the second digital media stream from the third device, the first and second performance metrics to indicate performance levels of the first device;
    producing, by executing an instruction with processor circuitry, a first hint usable by the second device, the first hint to cause a first adjustment of at least a first property of the first digital media stream; and
    sending the first hint to the second device and a second hint to the third device, the second hint to cause a second adjustment of at least a second property of the second digital media stream, the second hint different from the first hint.

9. The method of claim 8, further including:
    computing a performance threshold corresponding to the first digital media stream based on at least one of an expected performance level of the first device, the at least the first property of the first digital media stream, or a display setting of the first device; and
    evaluating the first performance metric against the performance threshold, wherein the first device is to produce the first hint in response to the first performance metric not satisfying the performance threshold.

10. The method of claim 8, further including:
    mirroring screens of the second device and the third device;
    causing the presenting of the first digital media stream in a first window and the presenting of the second digital media stream in a second window the first and second windows to be on the display screen of the first device;
    identifying an input to the first device, the input to cause a prioritization of the first digital media stream over the second digital media stream;
    in response to identifying the input:
        causing a size of the first window to increase and a size of the second window to decrease;
        causing the second device to increase the at least the first property of the first digital media stream based on the first hint; and
        causing the third device to decrease the at least the second property of the second digital media stream based on the second hint.

11. The method of claim 10, wherein the at least the first and second properties include at least one of encoder information, file wrapper information, protocol information, a frame rate, an aspect ratio, a bit rate, a data rate, a sample rate, or a resolution.

12. The method of claim 8, wherein the first hint is a first suggestion included in a data structure identifiable by the second device, the first hint including at least one of a size or a type corresponding to the data structure.

13. The method of claim 8, wherein the performance levels include values corresponding to the presentations of the first and second digital media streams via the display screen.

14. The method of claim 8, wherein the performance levels include values corresponding to a performance of the processor circuitry during the presentations of the first and second digital media stream, the processor circuitry integrated into the first device.

15. A non-transitory machine readable storage medium comprising instructions to cause processor circuitry to at least:
    mirror screens of a first source computing device and a second source computing device on an output device of a destination computing device;
    calculate a first performance metric of the destination computing device based on a first output of a first digital media stream from the first source computing device and a second performance metric of the destination computing device based on a second output of a second digital media stream from the second source computing device, the first and second performance metrics to indicate performance levels of the destination computing device, the first digital media stream from the first source computing device via a wireless connection;
    determine a first hint usable by the first source computing device, the first hint to cause a first adjustment of at least a first property of the first digital media stream; and
    provide the first hint to the first source computing device and a second hint to the second source computing device, the second hint to cause a second adjustment of at least a second property of the second digital media stream, the second hint different from the first hint.

16. The non-transitory machine readable storage medium of claim 15, wherein the instructions are to cause the processor circuitry to at least:
    calculate a performance threshold corresponding to the first digital media stream based on at least one of an expected performance level of the destination computing device, the at least the first property of the first digital media stream, or an output setting of the destination computing device; and
    assess the first performance metric against the performance threshold, wherein the processor circuitry is to determine the first hint in response to the first performance metric not satisfying the performance threshold.

17. The non-transitory machine readable storage medium of claim 15, wherein the instructions are to cause the processor circuitry to at least:
    cause the first digital media stream to be presented in a first window and the second digital media stream to be presented in a second window, wherein the first and second windows are to display be on the output device of the destination computing device;
    recognize an input to the destination computing device, the input to indicate a prioritization of the first digital media stream over the second digital media stream;

in response to recognizing the input:
- cause a size of the first window to increase and a size of the second window to decrease;
- cause the first source computing device to increase the at least the first property of the first digital media stream based on the first hint; and
- cause the second source computing device to decrease the at least the second property of the second digital media stream based on a second hint.

18. The non-transitory machine readable storage medium of claim 17, wherein the at least the first and second properties include at least one of encoder information, file wrapper information, protocol information, a frame rate, an aspect ratio, a bit rate, a data rate, a sample rate, or a resolution.

19. The non-transitory machine readable storage medium of claim 15, wherein the first hint is a first recommendation included in a data structure identifiable by the first source computing device, the first recommendation including at least one of a size or a type corresponding to the data structure.

20. The non-transitory machine readable storage medium of claim 15, wherein the performance levels include values corresponding to the first and second outputs of the first and second digital media streams via the output device.

* * * * *